(12) United States Patent
Dobbs et al.

(10) Patent No.: US 6,195,407 B1
(45) Date of Patent: Feb. 27, 2001

(54) DETERMINATE POSITIONER ASSEMBLY

(75) Inventors: John McGregor Dobbs, Hamilton; Brian Michael McDermott, Tewksbury; James Albert Bowers, Jr., Danvers, all of MA (US)

(73) Assignee: Analogic Corporation, Peabody, MA (US)

(*) Notice: Subject to any disclaimer, the term of this patent is extended or adjusted under 35 U.S.C. 154(b) by 0 days.

(21) Appl. No.: 09/296,029

(22) Filed: Apr. 21, 1999

(51) Int. Cl.[7] .......................................... A61B 6/00
(52) U.S. Cl. ................... 378/4; 378/19; 378/193; 378/196
(58) Field of Search ................... 378/4, 19, 193, 378/196

(56) References Cited

U.S. PATENT DOCUMENTS

| | | | |
|---|---|---|---|
| 2,882,781 | 4/1959 | Gates | 85/33 |
| 3,831,460 | 8/1974 | Linley, Jr. | 74/459 |
| 3,977,269 | 8/1976 | Linley, Jr. | 74/441 |
| 4,048,897 | 9/1977 | Price, Jr. | 85/33 |
| 4,125,049 | 11/1978 | Price, Jr. | 85/33 |
| 4,210,033 | 7/1980 | Erikson et al. | 74/424.8 A |
| 4,249,426 | 2/1981 | Erikson et al. | 74/441 |
| 4,750,067 | 6/1988 | Gerfast | 360/106 |
| 4,787,794 | 11/1988 | Guthrie | 411/433 |
| 5,251,195 | * 10/1993 | Kawakami et al. | |
| 5,333,513 | 8/1994 | Blanding | 74/424.8 A |
| 5,550,886 | * 8/1996 | Dobbs et al. | 378/19 |

* cited by examiner

Primary Examiner—David V. Bruce
Assistant Examiner—Pamela R. Hobden
(74) Attorney, Agent, or Firm—McDermott, Will & Emery

(57) ABSTRACT

A determinate positioner assembly comprises a helical cam, such as a threaded lead screw, a follower element which continuously contacts the lead screw in a predetermined number of places for a determinate condition (neither over- nor underconstrained), an elastic member connecting the follower element to the leadscrew, and a driven element. The elastic member maintains continuous contact between the follower element and the cam, yet the combination of the elastic member and the follower element exert substantially zero net force on the cam in the x and y directions. The follower element is attached to the driven element with pivot structures which transmit axial movement from the follower element to the driven element and permit the follower element to "float" in the x and y directions while prohibiting its rotation about the x, y and z axes.

18 Claims, 4 Drawing Sheets

DETERMINATE POSITIONER ASSEMBLY

TECHNICAL FIELD

The present invention relates to high-precision positioner assemblies, and more particularly to a high-precision follower assembly for use with a helical cam, such as a leadscrew.

BACKGROUND OF THE INVENTION

It is frequently necessary to position objects with high precision and accuracy, and with a high reliability so that the objects can be placed in the same location repeatedly and without variation. Although there are many applications for such high-precision positioners, one in particular is the positioning of an aperture for defining an x-ray beam in, for example, a computed tomography (CT) scanner. More specifically, it is critical for diagnostic accuracy and reliability that the x-ray beam of a CT scanner be positioned precisely and reproducibly on a receiving surface of an x-ray detector. However, the position of the x-ray source may change over time due to thermal and gravitational forces on it. Accordingly, the position of the beam should be monitored and the aperture moved to compensate for changes in the position of the x-ray source so that the x-ray beam remains properly positioned. Other applications for such positioners include, for example, coordinate measuring machines, high-precision laser-cutting and laser-printing machines, and other applications in which high-precision placement of relatively modest loads is required.

A known technique for controlling the position of an x-ray beam aperture is to use a rotatable leadscrew coupled to a rotating shaft of a motor. A nut mates with the leadscrew and is attached to a slide (which includes a structure configured so as to define the aperture) that moves on a rail rigidly connected to the motor. When the leadscrew is rotated within the nut in either a clockwise or counterclockwise direction, the slide moves along the leadscrew by a corresponding amount. Such a mechanism may be used, for example, in the focal spot movement compensation system disclosed in U.S. Pat. No. 5,550,886 to Dobbs et al. and assigned to the assignee of the present invention.

There are several disadvantages to this type of mechanism. First, the movement of a nut on a leadscrew is likely to result in backlash caused by the presence of small but necessary clearances between the threads of the nut and the leadscrew. This makes it difficult to smoothly and rapidly adjust the position of the nut in both directions. Another problem is that the precise repositioning of the slide at any one position is usually not reproducible. Many potential contact points exist between the threads of the leadscrew and of the nut. As the nut moves around and along the leadscrew, the points of contact between the nut and the leadscrew are constantly changing. The repositioning of the nut at any one position on the leadscrew, and thus of the slide on the rail, is usually not reproducible. Further, additional torque is required to overcome the binding that results from the nut traveling on the leadscrew. As a result, the driver for the leadscrew must be sufficiently oversized and/or more powerful than would otherwise be necessary, and this in turn causes other components to be oversized or more powerful than would otherwise be necessary.

In addition, unless the leadscrew and the nut are always in perfect alignment, the nut will tend to bind on the leadscrew as the nut approaches the fixed end of the leadscrew. In general, the rail on which the slide moves is not exactly parallel to the leadscrew, and the leadscrew itself is generally not exactly parallel to the shaft of the motor which drives it. Therefore, the distance between the center of the leadscrew and the center of the nut is not constant as the nut moves along the leadscrew, and this can result in binding of the nut on the leadscrew.

It would thus be advantageous to provide a positioner assembly which overcomes the deficiencies of prior art leadscrew and nut mechanisms and which can provide high-precision movement of modest loads with reproducible positioning of the loads.

SUMMARY OF THE INVENTION

According to one aspect of the invention, there is provided a determinate positioner assembly, comprising:

a helical cam extending in the direction of a first (z) axis;

a follower element extending partially around a portion of the outside surface of the helical cam and contacting a bearing surface of the cam in a predetermined number of locations;

a driven element connected to the follower element by a set of pivot elements; and an elastic member elastically connecting the follower element to the helical cam. The follower element is urged toward the cam to ensure substantially continuous contact between it and the bearing surface of the cam. The elastic member and follower element exert substantially zero net force on the cam in the x and y directions orthogonal to the first (z) axis.

According to the invention, a given rotation of the helical cam produces a corresponding and reproducible linear translation of the follower element and the driven element relative to the cam in the direction of the first (z) axis.

The pivot elements extend, respectively, in the direction of the first (z) axis and a second, orthogonal (y) axis and fix the follower element with respect to the driven element to prevent relative movement of the follower element and the driven element in the direction of the first (z) axis. In addition, the pivot elements permit translation of the follower element in the direction of the second (y) axis as well as in the direction of a third, mutually orthogonal (x) axis while substantially prohibiting rotation of the follower element about the x, y and z axes.

In a preferred embodiment, the helical cam is a threaded leadscrew, and the follower element contacts adjoining flanks of the leadscrew in two places on each flank. The pairs of contact locations are preferably spaced apart by less than 180 degrees, and are more preferably spaced apart by approximately 90 degrees.

The assembly may further include a mechanism for continuously lubricating the bearing surfaces of the helical cam during operation of the positioner assembly.

In one preferred embodiment, the pivot elements comprise flexures which may be, for example, a pair of wires extending in the direction of the first (z) axis and a pair of wires extending in the direction of the second (y) axis. Alternatively, they may comprise a four-legged object extending in the direction of the second (y) axis, and a pair of wires extending in the direction of the first (z) axis. In still other embodiments, the pivot elements may comprise linkages with ball and socket joints, or trunnions, or other relatively heavy duty pivot structures.

According to another aspect of the invention, there is provided an x-ray scanning system of the type including a gantry including a disk for supporting at least an x-ray source, and a frame for rotatably supporting the disk for rotation about a rotation axis, an x-ray detector assembly including a plurality of x-ray detectors cooperative with said x-ray source, and a data acquisition system for processing signals received from said detectors. The x-ray scanning system further comprises a determinate positioner assembly as described above to control the positioning of the x-ray beam.

In accordance with another aspect of the present invention, a determinate positioner assembly is provided for reliably moving, and precisely and reproducibly positioning, a driven device constrained to move in a longitudinal direction. The positioner assembly comprises:

a helical cam extending substantially along a longitudinal axis; and a follower coupling the driven device to the helical cam so that the follower moves the driven device in the direction of the longitudinal axis in response to movement of the helical cam, while allowing the follower and helical cam to move together relative to the driven device in directions orthogonal to the longitudinal axis for at least a limited range of motion.

In one preferred embodiment the follower contacts the cam at a predetermined number of points so as to properly constrain the follower with respect to the cam in the longitudinal direction. In one preferred aspect of this embodiment, the cam is a threaded lead screw having inclined opposing flank surfaces helically extending around the lead screw. The follower includes two contact elements biased into contact with two opposing flank surfaces of the lead screw so that each contact element contacts a flank surface in exactly two locations. In another preferred aspect of this embodiment, an elastic member, such as, for example, a spring, is included for biasing the contact elements into contact with the flank surfaces.

In accordance with one aspect of the invention, the contact elements are each biased into contact with the flank surfaces at angularly displaced positions relative to one another. In one preferred embodiment, a spring or other elastic member is used to bias the two contact elements into contact with the flank surfaces. The two contact elements are preferably spaced apart by less than 180 degrees.

In accordance with another aspect of the invention, the positioner assembly is used in an x-ray scanning system of the type including a gantry including a disk for supporting at least an x-ray source and a collimator cooperative with the x-ray source so as to define an X-ray beam, a frame for rotatably supporting the disk for rotation about a rotation axis, an x-ray detector assembly including a plurality of x-ray detectors cooperative with said x-ray source, and a data acquisition system for processing signals received from said detectors. In this embodiment, the x-ray scanning system further comprises a determinate positioner assembly including:

a helical cam extending substantially along a longitudinal axis; and a follower coupling the collimator to the helical cam so that the follower moves the collimator in the direction of the longitudinal axis in response to movement of the helical cam, while allowing the follower and helical cam to move together relative to the collimator in directions orthogonal to the longitudinal axis for at least a limited range of motion.

In accordance with one aspect of the invention, the x-ray scanning system further includes a beam positioning compensation system constructed and arranged so as to determine the position of the beam relative to the x-ray detector assembly and operate the determinate positioner assembly so as to move the collimator as necessary in order to maintain an alignment of the beam and the detector assembly.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be made to the following detailed description taken in connection with the accompanying drawings, in which.

Like elements in the FIGURES are denoted with like reference numerals.

DETAILED DESCRIPTION OF THE DRAWINGS

The term "determinate", as used herein, refers to the predictability and precision with which an object can be placed or located. Conversely, the term "indeterminate", as used herein, refers to the absence of such predictability and precision in the placement of an object.

Figure 1:
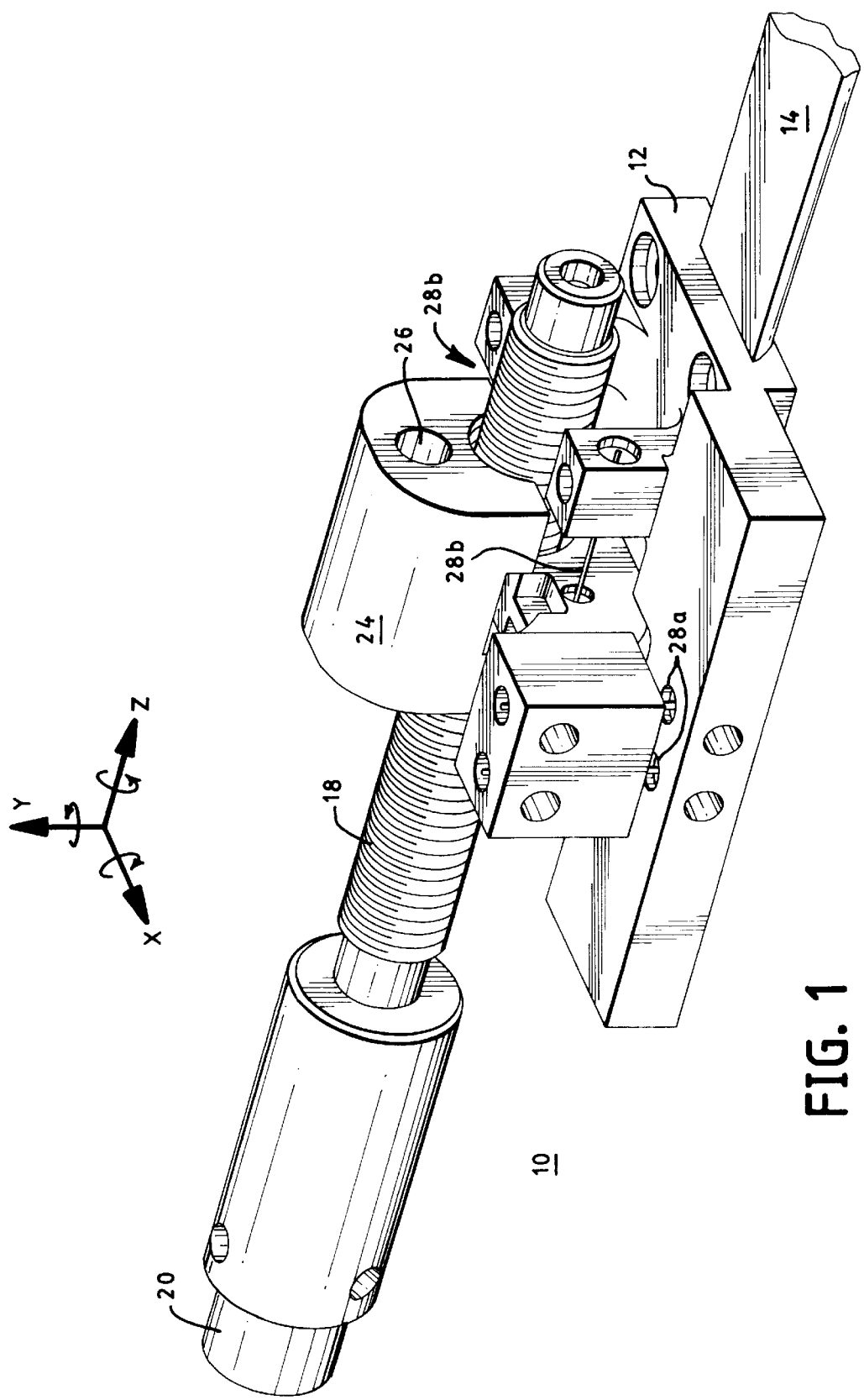
FIG. 1 is a perspective view of a determinate positioner assembly according to the invention.
Figure 2:
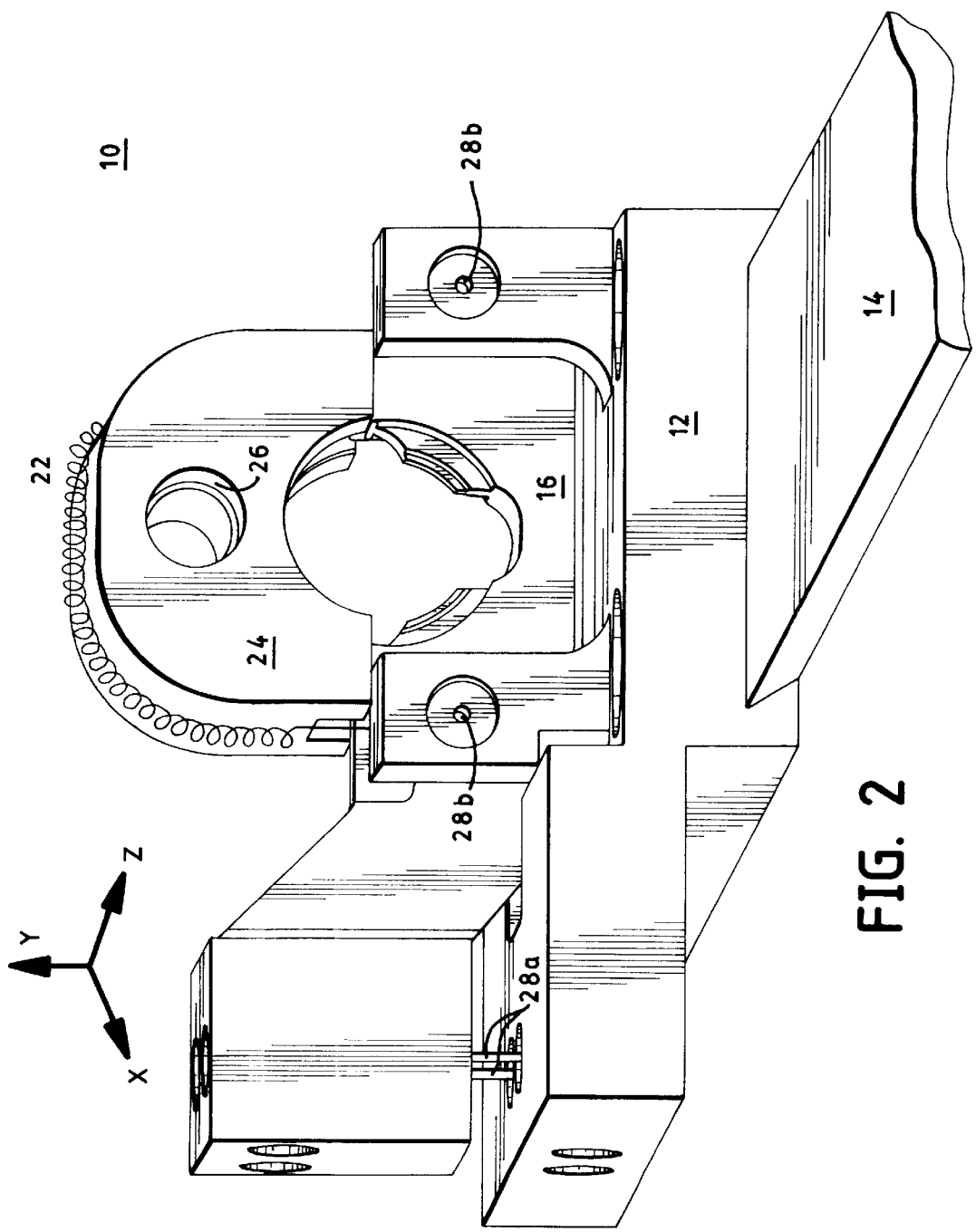
FIG. 2 is a perspective detail view of a portion of the determinate positioner assembly of FIG. 1.
Figure 3:
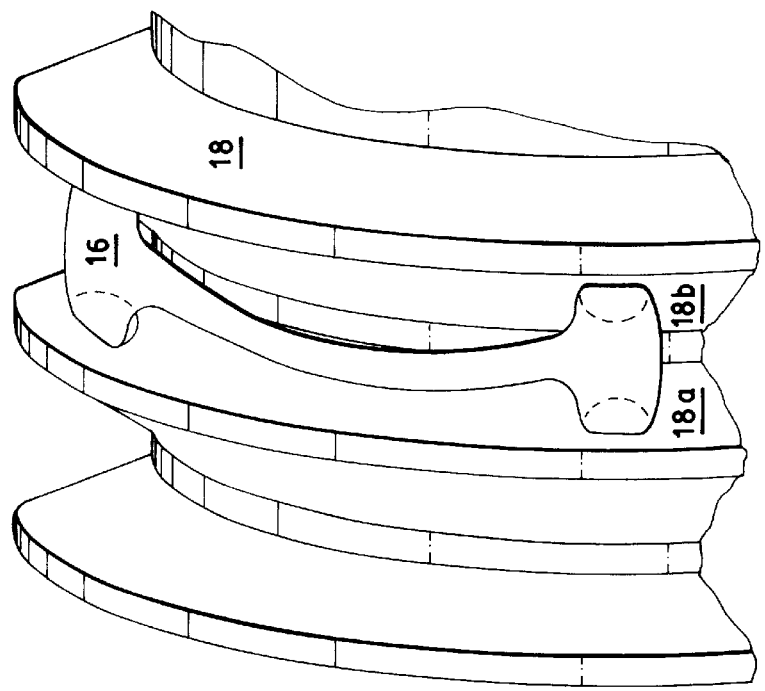
FIG. 3 is a detail view of a portion of a threaded leadscrew and a follower element in contact with the threads of the leadscrew.

The present invention, shown most clearly in FIGS. 1 and 2, is a determinate positioner assembly 10 which reproducibly establishes the position of a driven member such as, for example, a slide 12 on a rail 14. The position of the slide 12 is established by flexibly attaching to the slide a compliant follower element 16, which moves over a bearing surface of a threaded leadscrew 18, which serves as a helical cam. In practice, the rail 14 is not exactly parallel to the leadscrew shaft 18. The follower element 16 is held against the leadscrew with an elastic coupling member 22 and moves with the leadscrew as the leadscrew turns so as to remain in continuous contact with the bearing surfaces, or flanks 18a, 18b, etc. of the leadscrew, as shown in FIG. 3. The slide 12, which is attached to the follower element 16, thus does not rotate about the leadscrew 18 or about the two axes x, y which are mutually orthogonal to the longitudinal axis z of the leadscrew.

It is an important feature of the invention that the positioner assembly is configured as a cam and follower mechanism, rather than as a screw and nut assembly. The follower element 16 must be maintained in continuous contact with the leadscrew 18 in a predictable and reproducible manner as the leadscrew turns. As previously discussed, prior art nut and leadscrew devices lead to indeterminate conditions and are not satisfactory for high-precision, reproducible positioning of objects. A solution to this problem is to ensure that the follower element is properly constrained with respect to the leadscrew, i.e., that the follower element contacts the bearing surface of the leadscrew in the minimum number of locations required to completely determine its position on the bearing surface.

The concept of determinacy can be visualized by considering an object of unspecified shape at rest on a flat surface. A single point of contact between the object and the surface is clearly insufficient to locate the object on the surface, as the object can roll over, or tip relative to, the surface and will not remain at rest thereon. The object is said to be underconstrained. Two points of contact are also insufficient if the object is three-dimensional; this will result in tipping of the object, or rocking of the object between any two of three points in contact with the surface. Three points of contact define a plane and thus define the minimum number of contact locations required to position the object on the surface without tipping, rolling or rocking. Four or more points of contact represent an overconstrained condition in this example and would establish an indeterminate condition for the object on the surface. If the planar surface were not perfect, the object would rock back and forth between any three of the four points of contact as the object is moved over the surface. The transitions between one set of three contact points and other sets of three contact points are indeterminate and cause a lack of reproducibility in the position of the object. With respect to a cam and follower element, the direction of movement of the follower element in an overconstrained system determines, at least in part, the ultimate location of the follower element, and that situation produces an indeterminate condition.

Figure 4:
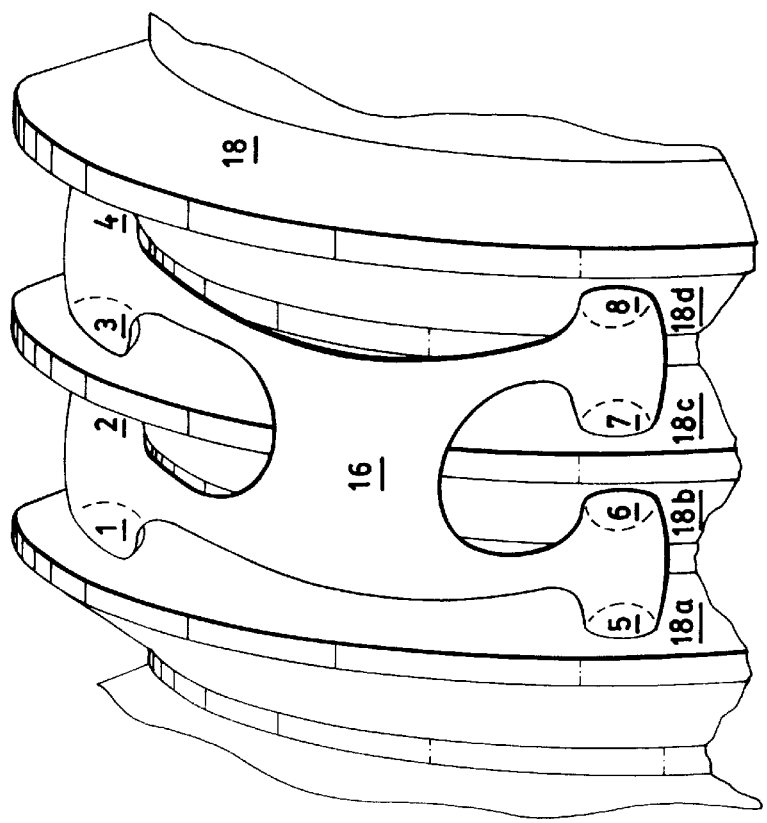
FIG. 4 is a detail view of a follower element in determinate contact with opposing flanks on a threaded surface.

In the present invention, the bearing surface is the outside surface of a threaded leadscrew 18, formed by two opposing inclined helical cam surfaces or flanks, shown for example at 18*a,* 18*b,* 18*c,* 18*d* in FIGS. 3 and 4, which define sides of the screw threads. It is desired to have the follower element 16 contact the bearing surfaces of the leadscrew at the minimum number of locations required to establish a determinate condition. As illustrated in the example above, three points of contact on any one substantially planar surface are sufficient to establish a determinate condition. However, in the case of a threaded leadscrew, the bearing surfaces form a two-sided helix. The follower element 16 must contact opposing flanks of the helical surface at two locations on each flank, or at precisely four locations, in order to establish a determinate condition. This is illustrated schematically in FIG. 3. It can be seen that contact between the follower element 16 at two locations of each of the opposing flanks 18*a,* 18*b* of the leadscrew (labeled contact points 1, 2, 3 and 4 in FIG. 3) establishes a determinate position of the follower element. If the follower element contacts one of the flanks at only one location, the position of the follower element on that flank is underconstrained and therefore indeterminate, as the follower element is free to move along the surface of the flank and will do so until a second contact point contacts that flank.

In FIG. 4 it can be seen that eight points of contact (1–8) between the follower element 16 and the leadscrew 18 create an overconstrained condition. As the leadscrew is turned, the follower element 16 can contact the flanks 18*a,* 18*b,* 18*c* and 18*d* in any four of eight possible locations which are determined by the shape of the cam surfaces of the leadscrew. The existence of more than one set of determinate points of contact creates an indeterminate condition, as the variations and transitions between one set of four contact points and other sets of four contact points cannot be well defined. Thus, if two contact points are chosen for each helical cam surface, and the remaining four contact points are eliminated, e.g., if locations 1, 2, 5 and 6, or 2, 3, 6 and 7, or 1, 3, 6 and 8, etc. are chosen as the only contact locations possible, a determinate condition would result, as the same four points of the follower element would always contact the leadscrew flanks.

As illustrated in FIGS. 3 and 4, in one embodiment of the invention, the follower element 16 is in the form of a four-legged object which contacts the leadscrew surface across a peak or a valley of the screw thread for two-point contact on each opposing flank.

As shown in FIG. 1, the leadscrew 18 is mounted on the shaft 20 of a motor (not shown) which is rigidly fixed relative to the rail 14 on which the slide 12 can move in the z direction. The slide 12 is connected flexibly to the follower element 16 with flexible pivot structures, as detailed more fully below. As the leadscrew 18 is rotated by the motor, it drives the flexibly mounted follower element 16 and the slide 12 mounted thereto in the direction of the z axis.

In one preferred embodiment, the follower element 16 is initially formed as a nut with threads which are complementary to those of the leadscrew. Portions of the threaded bore of the follower element 16 are then milled away to obtain two relatively short angular segments which are spaced apart circumferentially by less than 180 degrees, and therefore axially spaced by less than one half of a thread pitch. Thus, the follower element 16 does not fully surround the leadscrew as a typical nut would, but only partially surrounds it and is preferably open for fully half its circumference, as shown in FIG. 2. In a preferred embodiment, the points of contact are spaced circumferentially by approximately 90 degrees, as shown in FIG. 2, and thus axially by about ¼ of the pitch of the screw. The circumferential extent of the contact points is selected for convenience and is not critical to the invention, as long as it is not substantial.

The follower element 16 is held against the leadscrew with an elastic biasing member 22, such as a spring or elastic band. The combination of the elastic member and the follower element exerts substantially zero net force on the leadscrew in the x and y directions. The follower element thus does not constrain the leadscrew. Instead, the follower element and leadscrew easily move together as a unit in the x and y directions relative to the slide 12. The elastic member preferably exerts a spring force over a range which is sufficient to maintain the follower element in continuous contact with the leadscrew for the expected life of the assembly, so that when the respective parts wear, they are still held in continuous contact. This construction also eliminates any backlash that might otherwise be inherent in a nut and leadscrew assembly, as there is essentially zero clearance between the follower element and the leadscrew.

In one embodiment, a lubricant is dispersed over the bearing surfaces of the leadscrew to establish a lubricating film thereon. The lubricant can be contained, for example, in a reservoir 24 located between the leadscrew and the elastic member, as illustrated in FIG. 1, or on a replenishable pad (not shown). The lubricant can be introduced into the reservoir through access port 26. Oil, grease and the like are suitable lubricants; however, any lubricating agent can be used.

The slide 12 is attached to the follower element 16 with flexible pivot mounts such as, for example, flexures 28, as shown in FIGS. 1 and 2. For relatively modest loads, flexures are a preferred pivot structure. Two sets of flexures 28*a,* 28*b* are shown in FIGS. 1 and 2; the flexible wires 28*a* extend in the direction of the y axis and prevent rotation of follower element 16 and slide 12 about the x and z axes. The flexible wires 28b extend in the direction of the z axis and prevent rotation of the follower element and slide about the y axis. They also fix the follower element 16 with respect to the slide 12 in the direction of the z axis.

The wires 28a could be replaced with a flexible metal ribbon, which would also prevent rotation of the follower element and slide about the x and z axes.

For heavier loads, it may be preferred to use relatively heavy duty linkages with ball and socket joints, trunnions, or other heavy duty pivot structures.

Figure 5:
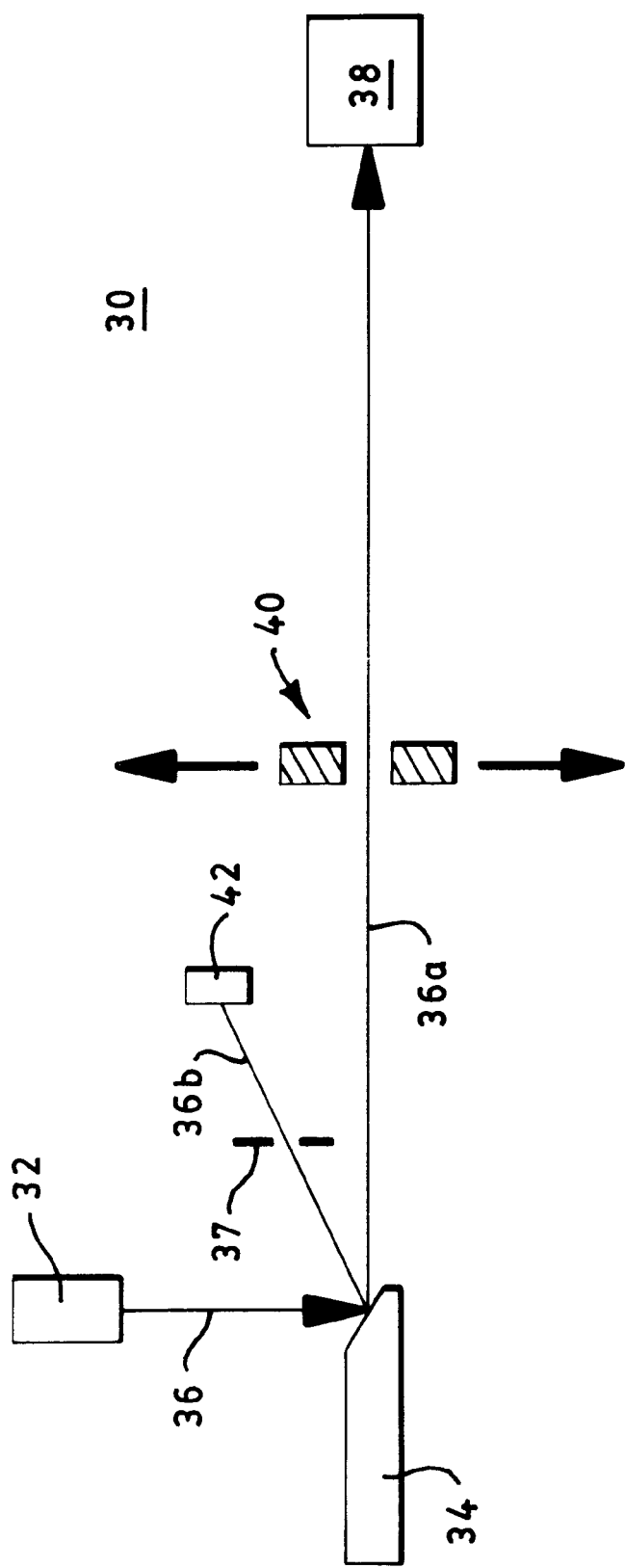
FIG. 5 is a schematic diagram of an x-ray source and detector assembly in an x-ray scanning system, in which a determinate positioner assembly according to the invention is used to position the x-ray beam aperture.

FIG. 5 illustrates a portion of a CT scanner system in which a determinate positioner assembly as described herein may be used. The scanner system 30 includes a source 32 of electrons, a rotating anode 34 which receives electrons 36 from source 32 and defines a focal spot from which x-rays emanate, forming the source of the x-ray beams 36a and 36b, which are defined, respectively, by primary aperture 40 and secondary aperture 37. A primary detector system 38 receives the primary x-ray beam 36a as collimated through a primary aperture 40. A secondary detector system 42 detects the position of a secondary x-ray beam 36b through a secondary aperture 37 and is connected to a control mechanism for adjusting the position of the primary aperture 40 to compensate for any change in the position of the beams 36a and 36b by virtue of a change in position of the focal spot.

The primary aperture 40 is fixed relative to the driven element 12 illustrated in the assembly of FIGS. 1 and 2 by means known in the art and is positioned by the movement of the follower element 16, to which it is flexibly attached, on the leadscrew 18. Thus, the primary aperture 40 is capable of precise and reproducible movement so as to position the x-ray beam on the detector assembly 38, regardless of changes in the position of the anode.

The positioner assembly of the present invention allows the position of a given aperture to be maintained with a reproducibility of 2 microns. In addition, manufacturing of the assembly is relatively simple and inexpensive, and performance of the positioner is superior to that obtained with prior art leadscrew and nut positioner assemblies.

Because certain changes may be made in the above apparatus without departing from the scope of the invention herein disclosed, it is intended that all matter contained in the above description or shown in the accompanying drawings shall be interpreted in an illustrative and not a limiting sense.

What is claimed is:

1. A determinate positioner assembly, comprising:
   a helical cam extending in the direction of a first (z) axis;
   a follower element, extending partially around a portion of the outside surface of the cam and contacting a bearing surface of the helical cam in a predetermined number of locations;
   a driven element connected to the follower element by a set of pivot elements; and
   an elastic member elastically connecting the follower element to the helical cam such that the follower element is urged toward the cam to ensure substantially continuous contact between the follower element and the bearing surface of the helical cam, wherein the elastic member and the follower element exert substantially zero net force on the cam in the direction of x and y axes orthogonal to the z axis;
   wherein a given movement of the helical cam produces a corresponding and reproducible linear translation of the follower element and the driven element relative to the cam in the direction of the first (z) axis.

2. A determinate positioner assembly according to claim 1, wherein the pivot elements extend, respectively, in the direction of the first (z) axis and a second, orthogonal (y) axis and fix the follower element with respect to the driven element to prevent relative movement of the follower element and the driven element in the direction of the first (z) axis, and wherein the pivot elements permit translation of the follower element in the direction of the second (y) axis as well as in the direction of a third, mutually orthogonal (x) axis while substantially prohibiting rotation of the follower element about the x, y and z axes.

3. A determinate positioner assembly according to claim 2, wherein the helical cam comprises a threaded leadscrew, and wherein the follower element contacts two opposing bearing surfaces on the helical cam at two locations on each bearing surface.

4. A determinate positioner assembly according to claim 3, wherein the follower element contacts the opposing surfaces of the leadscrew in two locations spaced apart by less than 180 degrees.

5. A determinate positioner assembly according to claim 4, wherein the follower element contacts the opposing surfaces of the leadscrew in two locations spaced apart by approximately 90 degrees.

6. A determinate positioner assembly according to claim 1, further comprising means for continuously lubricating the bearing surface of the cam during operation of the positioner assembly.

7. A determinate positioner assembly according to claim 1, wherein the pivot elements comprise flexures.

8. A determinate positioner assembly according to claim 7, wherein the flexures comprise a pair of wires extending in the direction of the first z axis and a pair of wires extending in the direction of the second y axis.

9. A determinate positioner assembly according to claim 7, wherein the flexures comprise a substantially four-legged object extending in the direction of the second y axis, and a pair of wires extending in the direction of the first z axis.

10. A determinate positioner assembly for reliably moving, and precisely and reproducibly positioning, a driven device constrained to move in a longitudinal direction, comprising:
    a helical cam extending in the direction of a longitudinal axis; and
    a follower coupling the driven device to the helical cam so that the follower moves the driven device in the longitudinal direction in response to movement of the helical cam, while allowing the follower and helical cam to move together in directions orthogonal to the longitudinal axis for at least a limited range of motion.

11. A determinate positioner assembly in accordance with claim 10, wherein the follower contacts the cam at a predetermined number of points so as to properly constrain the follower with respect to the cam in the direction of the longitudinal axis of the cam.

12. A determinate positioner assembly in accordance with claim 11, wherein the cam is a threaded lead screw having inclined opposing flank surfaces helically extending around the lead screw, wherein the follower includes four contact elements biased into contact with two opposing flank surfaces so as to contact each flank surface at exactly two locations.

13. A determinate positioner assembly in accordance with claim 12, further including an elastic biasing member for biasing the contact elements into contact with the flank surfaces.

14. A determinate positioner assembly in accordance with claim 12, wherein the contact elements are biased into contact with the flank surfaces at angularly displaced positions relative to one another.

15. A determinate positioner assembly in accordance with claim 14, wherein the two contact elements are angularly spaced apart by less than 180 degrees.

16. An x-ray scanning system of the type including a gantry including a disk for supporting at least an x-ray source, and a frame for rotatably supporting the disk for rotation about a rotation axis, an x-ray detector assembly including a plurality of x-ray detectors cooperative with said x-ray source, and a data acquisition system for processing signals received from said detectors, wherein the x-ray scanning system further comprises a determinate positioner assembly, including:

i. a helical cam extending in the direction of a first (z) axis;

ii a follower element extending partially around a portion of the outside surface of the cam and contacting a bearing surface of the helical cam in a predetermined number of locations;

iii. a driven element connected to the follower element by a set of pivot elements; and iv. an elastic member elastically connecting the follower element to the helical cam such that the follower element is urged toward the cam to ensure substantially continuous contact between the follower element and the bearing surface of the helical cam, wherein the elastic member and the follower element exert substantially zero net force on the cam in the direction of x and y axes orthogonal to the z axis;

wherein a given rotation of the helical cam produces a corresponding and reproducible linear translation of the follower element and the driven element relative to the cam in the direction of the first (z) axis.

17. An x-ray scanning system of the type including a gantry including a disk for supporting at least an x-ray source and a collimator cooperative with the x-ray source so as to define an X-ray beam, a frame for rotatably supporting the disk for rotation about a rotation axis, an x-ray detector assembly including a plurality of x-ray detectors cooperative with said x-ray source, and a data acquisition system for processing signals received from said detectors, wherein the x-ray scanning system further comprises a determinate positioner assembly including:

a helical cam extending in the direction of a longitudinal axis; and a follower coupling the collimator to the helical cam so that the follower moves the collimator in the direction of the longitudinal axis in response to movement of the helical cam, while allowing the follower and helical cam to move together in directions orthogonal to the longitudinal axis for at least a limited range of motion.

18. An x-ray scanning system according to claim 17, further including a beam positioning compensation system constructed and arranged so as to determine the position of the beam relative to the x-ray detector assembly and operate the determinate positioner assembly so as to move the collimator as necessary in order to maintain an alignment of the beam and the detector assembly.

* * * * *